United States Patent Office

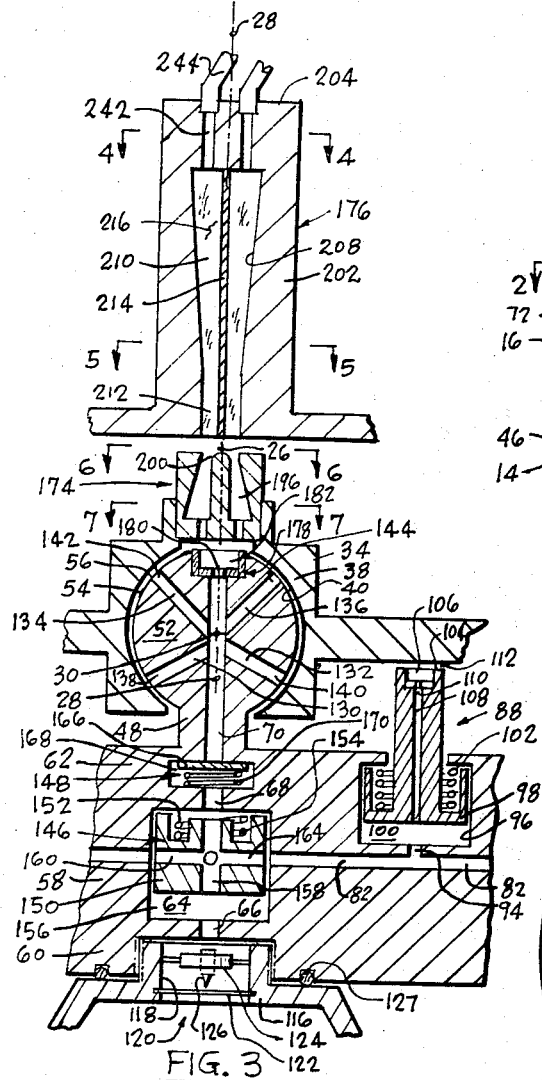
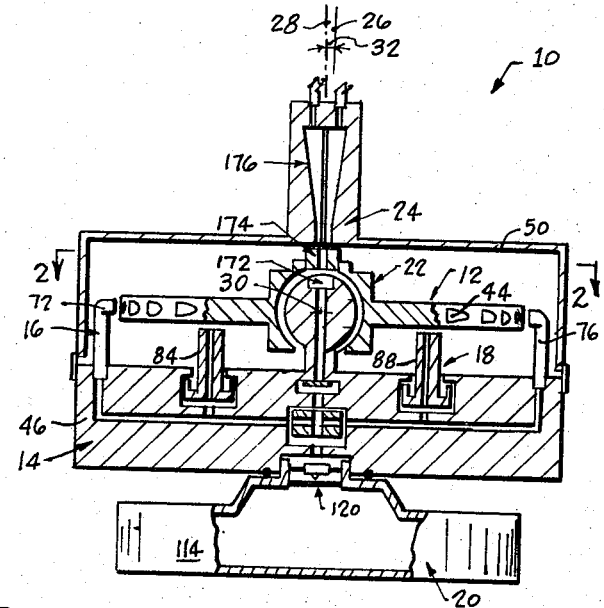
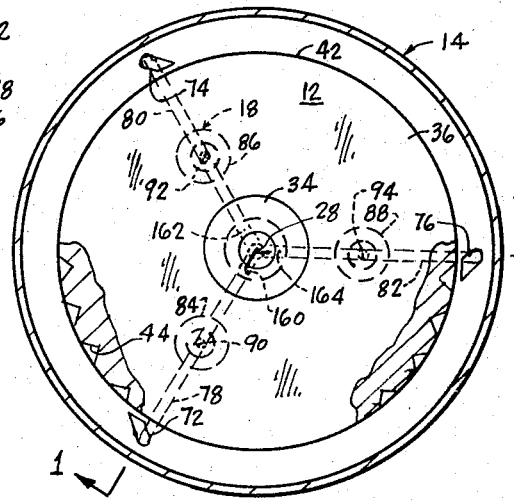
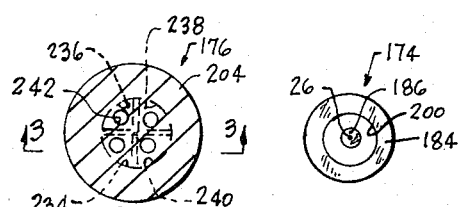
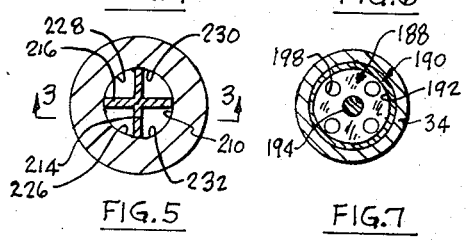
FIG. 3  FIG. 1  FIG. 2  FIG. 4  FIG. 5  FIG. 6  FIG. 7
JOHN L. EVANS
HUGH E. RIORDAN
HAROLD J. STRAUT
INVENTORS
BY
*Thomas W. Kennedy*
ATTORNEY

3,416,378
Patented Dec. 17, 1968

3,416,378
FREE-ROTOR GYRO
John L. Evans, Oakland, Hugh E. Riordan, Wyckoff, and Harold J. Straut, Wayne, N.J., assignors to General Precision Systems Inc., a corporation of Delaware
Filed Sept. 24, 1965, Ser. No. 489,913
17 Claims. (Cl. 74—5.6)

ABSTRACT OF THE DISCLOSURE

A gyro wherein the gas bearing, gas pickoff, gas drive and gas caging mechanism are operated from a single gas supply. The rotor has a pivot point supported by the stator so that the rotor may both spin and tilt about the stator. The stator has axes defined therein. A gas pickoff arrangement is provided for sensing the amount and direction of the rotor tilt relative to these defined axes. The pickoff arrangement includes in part a gas jet attached to and moving with the rotor.

---

The present invention relates to a two-axis, free-rotor gas bearing gyro, and particularly to a two-axis, free-rotor gas bearing gyro which has a gas-actuated pickoff means.

A conventional two-axis, free rotor, gas bearing gyro is described in U.S. Patent No. 3,115,784, which is assigned to the same assignee as in this invention. Said conventional two-axis, free-rotor gas bearing gyro includes a stator, a rotor journaled on said stator for tilting in any direction and for rotation relative to said stator, a gas bearing disposed between said rotor and said stator to minimize friction therebetween, and an electro-magnetic pickoff means for sensing the angle and direction of tilt of said rotor relative to the stator.

One problem with said conventional two-axis, free-rotor gas bearing gyro is that it requires two separate power supplies, including an electrical supply for the electromechanical pickoff and a gas supply for the gas bearing.

In accordance with one embodiment of the present invention, a gas-actuated pickoff is provided instead of an electromechanical pickoff whereby the electrical supply can be eliminated.

Accordingly, it is one object of the invention to provide a two-axis, free-rotor gas bearing gyro which has a gas-actuated, two-axis pickoff means.

It is another object of the invention to provide a gyro according to the aforementioned object, which has a gas-type rotor drive and which has a gas-type, two-axis, rotor-caging mechanism.

It is still another object of the invention to provide a gyro according to the aforementioned objects in which the gas bearing, the gas pickoff, the gas drive and the gas-caging mechanism are operated from a single gas supply.

To the fulfillment of these and other objects the invention provides a gyro comprising a rotor with a spin axis having a pivot point thereon, a stator with an axis intersecting said spin axis at said pivot point forming a tilt angle therebetween, and a gas pickoff means for sensing the amount and the direction of said tilt angle having cooperating portions respectively mounted on said rotor and on said stator.

Other objects of the invention will become apparent upon reading the annexed detailed description in connection with the drawings, wherein like parts are designated by like numerals throughout the several views, and wherein:

FIG. 1 is a sectional view of a two-axis, free-rotor gas bearing gyro embodying features of the present invention;

FIG. 2 is a sectional view taken along the line 2—2 of FIG. 1;

FIG. 3 is an enlarged portion of FIG. 1;

FIG. 4 is a sectional view taken along the line 4—4 of FIG. 3;

FIG. 5 is a sectional view taken along the line 5—5 of FIG. 3;

FIG. 6 is a sectional view taken along the line 6—6 of FIG. 3; and

FIG. 7 is a sectional view taken along the line 7—7 of FIG. 3.

Referring to FIG. 1, one embodiment of the present invention is a two-axis, free-rotor gas bearing gyro 10, which comprises a rotor 12 and a stator 14 for support of rotor 12.

Gyro 10 also has a gas drive means 16 to spin up rotor 12 at start up condition to a desired operating speed level, a gas caging means 18 for positioning rotor 12 relative to stator 14 during said spin up, a gas supply means 20, a gas bearing means 22 and a gas pickoff means 24. Gas pickoff means 24 senses the tilting of rotor 12; gas bearing means 22 provides a low-friction, lubricated coupling of rotor 12 to stator 14; and gas supply means 20 is the source of gas supply to said drive 16, said cage 18, said pickoff 24 and said bearing 22.

Rotor 12 (FIGS. 1, 2) has a spin axis 26; and stator 14 has a longitudinal axis 28. Axis 26 has a pivot point 30 at which axes 26 and 28 intersect making the slight angle of tilt 32 therebetween. Pivot point 30 is preferably also the mass center of gravity of rotor 12 to minimize rotor unbalance.

Rotor 12 (FIGS. 1, 2, 3), which is in the shape of a wheel, has a hub portion 34 and a rim portion 36. Hub 34 has a bearing portion 38, which has a spherically-shaped, radially-inner bearing surface 40. Rim 36 has an outer edge 42, which faces in a radially-outward direction. Edge 42 has a plurality of turbine-bucket grooves 44, which are equi-spaced angularly about axis 28.

Stator 14 (FIGS. 1, 2, 3) includes a base portion 46 of cylindrical profile, which is symmetrically disposed about axis 28; and includes a shaft 48, which is fixedly connected to base 46 coaxially therewith. Stator 14 also has a cap member 50, which is connected to and supported by base 46 for enclosing rotor 12. Shaft 48 has a ball portion 52, which has a spherically-shaped, radially-outer bearing surface 54, that is separated from surface 40 by a substantially-uniform gap 56. Base 46 has a peripheral wall 58 and a pair of axially spaced end walls 60, 62 which together form a cavity 64 therebetween. Lower wall 60 has a lower passage 66 that interconnects gas supply 24 to cavity 64 for supply thereto. Upper wall 62 has an upper passage 68, which connects to and extends upward from cavity 64. Shaft 48 and ball 52 have a common passage 70, which connects to and extends upward from passage 68.

Drive means 16 (FIGS. 1, 2) includes a plurality of gas nozzles 72, 74, 76, which have respective passages 78, 80, 82, that connect to cavity 64 at the radially-inner ends thereof. Nozzles 72, 74, 76 are equi-angularly spaced about axis 28 and direct their turbine jets at buckets 44 for spin up of rotor 12.

Cage means 18 (FIGS. 1, 2) include caging mechanisms 84, 86, 88, which are equi-angularly spaced about axis 28 and which have respective supply passages 90, 92, 94 that connect to passages 78, 80, 82 for supply of gas thereto. Cage mechanism 88, which is described in detail hereafter, is identical to cage mechanisms 84, 86. Cage mechanism 88 has a cylindrical portion 96, which is formed by a cylindrical recess in wall 62. Cage mechanism 88 also has a piston 98, which is received in cylinder 96, forming a chamber 100 therebetween. Chamber 100 is connected to cavity 64 by passages 94, 82 for gas supply thereto. Gas pressure in chamber 100 urges piston 96 axially-upwardly in an extended or operating position.

Cage mechanism 88 also has a spring means 102, which is disposed in cylinder 96 adjacent to the upper end of piston 98 for urging piston axially-downward in a retracted or shut-down position. Spring 102 urges piston 98 to return to its retracted position when the gas flow to chamber 100 from cavity 64 is shut off in a manner as explained hereafter at a certain time interval after start up when rotor 12 reaches its operating speed level. Piston 98 has an upper end face 104 with an annular recess 106, which positions and centers spring 102 inside cylinder 96. Piston 98 also has a conduit 108, which extends therethrough and which has a flow-restricting opening 110 adjacent to face 104 for providing a lubricating and bearing gas film on face 104. Face 104 is separated from rotor underside by a gap 112, which contains a gas film that lubricates and supports rotor 12 during a spin up of rotor 12 to its operating speed level. With this construction, cage means 18 aligns axes 26 and 28, and prevents titlting of rotor 12 relative to stator 14 during the spin up of rotor 12. In this way, gyro error due to a precession of gyro 10 caused by a tilting of rotor 12 during spin up is substantially eliminated.

Gas supply 20 (FIGS. 1, 3) includes a compressed-gas bottle 114 which has a cylindrical flange 116 with an opening 118 that connects to stator 14 and passage 66 for supply to cavity 64. Gas bottle 114 has a gas-release mechanism 120 which is disposed in opening 118. Release mechanism 120 includes a rupturable disk 122, which is fixedly connected to flange 116. Release 120 has a firing means 124 with a sharp-ended piston 126, which is disposed adjacent to disk 122 for puncturing disk 122 at start up condition and for releasing gas to cavity 64. Firing means 124 is normally actuated by a signal, such as by the application of a high-acceleration force on gyro 10. Flange 116 has an O-ring seal 127 on its axially-outer side, which bears against wall 60 for sealing the adjacent connection. Supply 20 provides gas at a very high initial gas pressure at release condition at the start of rotor spin up, which gradually drops to a very low terminal gas pressure over a time period interval before being entirely exhausted.

Gas bearing means 22 (FIGS. 1, 3, 4, 5, 6, 7) has a single main flow passage along axis 28 including passage 66, cavity 64, passage 68 and passage 70 for connection to supply 20. Ball portion 62 has a plurality of conduits 130, 132, 134, 136, which connect to ball passage 70 and which have respective flow-restricting outlet ports that are disposed in surface 54 for flow to gap 56 from supply 20. With this construction, gap 56 is provided with a gas-bearing and gas-lubricating film.

Gas bearing 22 and flow passage means 128 (FIG. 3) also have an automatic shut-off valve 146, which is disposed in cavity 64, and a pressure regulator 148, which is disposed in passage 68.

Valve 146 (FIG. 3) includes a cylindrical piston 150, which is received in cavity 64 for sealing engagement therewith and for displacement relative thereto. Piston 150 divides cavity 64 into an upper chamber 152, which connects to passage 68, and which contains a spring means 154, and a lower chamber 156, which connects to passage 66 and which contains gas from bottle 114. Chamber 156 has a pressure during rotor spin up sufficient to overcome spring 154 until said rotor spin up is accomplished. Piston 150 has an axial passage 158, which connects chambers 152 and 156, and has a plurality of radial passages 160, 162, 164, which respectively connect to passages 78, 80, 82.

With this construction, valve 146 shuts off only that part of gas flowing to drive 16 and cage 18 at the end of rotor spin up when the pressure in bottle 114 is about midway between its initial pressure and its terminal pressure. In addition, valve 146 delays its opening at start up to permit supply of gas to bearing 22 for a short time interval prior to a supply of gas to drive 16.

Regulator 148 (FIG. 3) is fully described in co-pending U.S. patent application Ser. No. 465,993, which is assigned to the same assignee as in this invention. Regulator 148 includes a porous disk 166 with radial pores or capillaries. Passage 68 has an enlarged portion or chamber 168. Disk 166 is disposed in chamber 168 overlapping passage 68 at one end of chamber 168. Regulator 148 also has a spring means 170, which positions disk 166 within chamber 168.

With this construction, regular 148 provides a substantially-constant gas pressure to pickoff 24 and to bearing 22 during the time that pressure of gas in chamber 168 drops from its high initial pressure to its low terminal pressure.

Pickoff 24 (FIGS. 1, 3, 5, 6, 7) includes a shaft jet-supply unit 172, which is coaxial with stator 14 along axis 28, a rotor jet-orifice unit 174, which is coaxial with rotor 12 along axis 26, and a cap jet-receiver unit 176, which is coaxial with stator 14 along axis 28.

Jet supply 172 (FIG. 3) includes a tube 178, which is supported by shaft 48 and which is fixedly connected to ball portion 52 coaxially therewith. Tube 178 has a flow-restricting, pressure-dropping passage 180, which extends therethrough and which connects to passage 70. Passage 180 has an enlarged jet-supply chamber 182, which faces in an axially-outward direction toward jet-orifice unit 174.

Jet orifice 174 (FIG. 3), which is disposed axially between supply 172 and receiver 176, includes an outer body 184, and an inner body 186, which are coaxial along axis 26. Outer body 184 is fixedly connected to rotor hub 34 for support therefrom. Outer body 184 has an end wall 188 and a peripheral wall 190 with a tapering or conical radially-inner surface 192. Inner body 186 is fixedly connected to end wall 188 and is supported therefrom and has a cylindrical radially-outer surface 194, which is concentric with surface 192 about axis 26 forming an annular converging passage 196 therebetween. Passage 196 is also concentric about axis 26 and converges in an axially-outward direction. Wall 188 has a plurality of peripherally-spaced inlet openings 198, which communicate with chamber 182 and which open into the larger end of annular passage 196. Passage 196 has an annular outlet port 200 at the smaller diameter end of said passage 196, which faces in an axially-outward direction at receiver unit 176. Port 200 is symmetrical about axis 26 whereby its jet reaction force extends vectorially through pivot point 30 and whereby stray reaction torques on rotor 12 are avoided.

Jet receiver 176 (FIGS. 3, 4, 5) also has an outer body 202, which is coaxial with stator 14 along axis 28. Outer body 202 is fixedly connected to cap 50 coaxially therewith. Outer body 202 also has an end wall 204 and a peripheral wall 206 with a tapering or conical radially-inner surface 208 forming a diverging passage 210 therethrough. Passage 210 has an inlet port 212, which faces outlet port 200. Outer body 202 also has a pair of egg-crate or criss-cross partition plates 214, 216, which are disposed in diverging passage 210 and in port 212.

Plates 214, 216 form four elongate diverging quadrant conduits with four quadrant openings 226, 228, 230, 232 in port 212, which are substantially equal in cross-sectional area and which have respective diffuser sections 234, 236, 238, 240 and which diverge in an axially-outward direction for reducing gas velocity therein. End wall 204 has a plurality of peripherally-spaced outlet holes or passages 242, which extend therethrough and open into diffusers 234, 236, 238, 240. Passages 242 have respective fluid flow tubes 244, which connect to a conventional fluid amplifier (not shown).

With this construction, pickoff 24 can directly operate a fluid-type mechanism (not shown), such as a vehicle steering mechanism.

The operation of the gyro is substantially as follows: Firing means 124 is actuated by a suitable external signal. Actuation of said firing means causes sharp ended piston 124 to penetrate seal disc 120 thereby releasing gas stored under pressure in container 114. The gas passes into chamber 64 through passage 66 causing the pressure in the chamber to rise. As the pressure in this chamber 64 exceeds a predetermined level which is established by the initial deflection and spring rate of spring 154, piston 150 is forced upward by the gas pressure on its lower surface until it comes to rest in the position shown in FIGURE 3.

The gas thereupon flows through passages 160, 164, 82, 90, 92, 94 to the chambers 100 below the three caging plungers 98, raising the pressure therein and thereby maintaining said plungers in the upper or caging position against the resistance of the springs 102, and thence through conduits 108, and restrictors 110 where the flow serves to establish a gas film on faces 104 which maintains the rotor in a fixed orientation relative to the plane established by the said three faces 104.

A portion of the gas passes through passages 158 and 68 to regulator 148 whence it passes at reduced and regulated pressure suitable to the gas bearing through passage 70 to the several conduits and ports in the gas bearing thereby levitating the rotor and leaving it free to spin and to tilt when the caging pads retract. Gas also passes through restrictor 180 to jet supply chamber 182 and thence through the pickoff jet outlet 200 in jet orifice unit 174.

The gas also flows through passages 78, 80, and 82 to turbine jets 72, 74, and 76, exiting from said jets impinging upon turbine buckets 44 and thereby spinning the gyro rotor 12 up to its operating speed.

As the gas flows from the container 114, the pressure in the container falls and so, consequently the pressure falls in chamber 64. When the pressure in chamber 64 falls below the value established by spring 154, piston 150 is urged downward by said spring, closing off passages 82 against further flow of gas from the supply ducts 160 and 164. Flow out of the turbine jets 72, 74, and 76 thereupon ceases and rotor 12 coasts freely. Pressure in the chambers 100 also falls; and when it falls below a value established by springs 102, the three caging plungers 98 retract under the urging of springs 102 leaving the rotor 12 free to tilt.

The gas remaining in the container 120 continues to flow through the regulator to the bearing and pickoff until the supply is exhausted.

The operation of the pickoff is as follows: As previously recited, after opening the closure of container 114, gas flows through the several conduits and regulator 148 eventually exiting through annular orifice 200, forming an annular jet which is substantially concentric with the spin axis of rotor 12.

Said annular jet impinges upon the entrance of receiver 176. When the rotor 12 is in its caged position, the intersection of the partition plates 214 and 216 lies substantially along the axis of the annular jet.

The flow of said jet impinges on divider plates 214 and 216 and is thereby divided into four substantially equal portions, each of which passes into one of the receiver quadrants having openings 226, 228, 230, 232. Because of the divergent shape of the sections 234, 236, 238, and 240, the kinetic energy of the entering flow is converted to static pressure which appears at the outlet passages 242.

The pressure appearing at the outlet 242 of each quadrant will be proportional to the magnitude of the mass flow entering the inlet 226, 228, 230 and 232 of each quadrant.

The magnitude of flow in turn will be proportional to the lengths of the segments of the annular jet intersected by each inlet (226, 228, 230, and 232). The length of each segment will be determined by the deviation of the axis of the annular jet from the intersection of the partition plates 214 and 216 which occurs when the gyro rotor 12 and hence the jet orifice 174 tilts relative to the stator 14.

Thus the relative magnitudes of the static pressures appearing at the receiver outlets 242 are directly related to the magnitude of the tilt of the gyro rotor 12 relative to the stator 14. In particular, suppose that the relative tilt of the rotor 12 occurs about the axis parallel to the line 3—3 in FIGURE 5, and in such a sense that the annular jet moves upward relative to the receiver as shown in FIGURE 5. This motion will cause a greater portion of the annular jet to be intersected by receiver entrance ports 228 and 230 and a lesser portion of said jet to be intercepted by ports 226 and 232. Accordingly, there will be a proportionate pressure rise in the receiver exit ports connected to receiver chambers 236 and 238 and a decrease in pressure at the ports connected to receiver chambers 234 and 240.

This pressure difference may be amplified by suitable pneumatic amplifiers connected to said outlet ports and used for any desired purpose.

For a tilt of the gyro rotor about the axis normal to line 3—3 in FIGURE 5, a similar differential pressure appears in the ports connecting chambers 234 and 236 relative to 238 and 240.

Thus by appropriately comparing the differential pressures among the outlet ports connected to the receiver chambers, pneumatic signals proportional to the components of tilt of the gyro rotor relative to the stator are easily obtained.

In summary, this invention provides a two-axis, free-rotor, gas-bearing gyro which has a gas-actuated, two-axis pickoff means, which has a gas-type rotor drive, and which has a gas-type, two-axis, rotor-caging mechanism, and in which said gas bearing, said gas pickoff, said gas drive, and said gas-caging mechanism are operated from a single gas supply.

While the present invention has been described in a preferred embodiment, it will be obvious to those skilled in the art that various modifications can be made therein within the scope of the invention. It is intended that the appended claims cover all such modifications.

What is claimed is:

1. A two-axis, free-rotor gyro comprising:
   a rotor with a spin axis having a pivot point thereon;
   a stator having a portion substantially surrounded by said rotor; said stator providing support for the rotor while permitting said rotor both to spin and to tilt about said pivot point; said stator having axes defined therein; and gas pickoff means for sensing the amount and direction of said rotor tilt relative to said axes; said gas pickoff means comprising in part a gas jet attached to and moving with said rotor.

2. A gyro as claimed in claim 1, in which said gas pickoff cooperating portions include:
   a jet-orifice unit with an outlet port mounted on said rotor coaxially therewith; and
   a jet-receiver unit with an inlet port mounted on said stator coaxially therewith and disposed axially-outwardly of said orifice unit.

3. A gyro as claimed in claim 2, in which said outlet port has an axis extending through said pivot point for providing a jet with a reaction force vector extending through said pivot point in order to substantially eliminate stray pickoff torques on said rotor.

4. A gyro as claimed in claim 2, in which said outlet port has an axis coinciding with said rotor spin axis and said inlet port has an axis coinciding with said stator axis whereby said tilt angle between said rotor and said stator axis coincides with the angle between said outlet port axis and said inlet port axis.

5. A gyro as claimed in claim 2, in which said inlet port has four quadrant openings equi-angularly spaced about said inlet port axis whereby a gas jet from said outlet port divides its flow between said inlet port quadrant openings according to the amount and the direction of the tilt of said rotor axis relative to said stator axis.

6. A gyro as claimed in claim 5, in which said quadrant openings have respective conduits with respective diffuser sections and with respective outlet openings whereby said pickoff means can be used as a control for a fluid-type mechanism.

7. A gyro as claimed in claim 2, in which said outlet port has a radially-spaced inner side wall and outer side wall forming an annular port opening therebetween concentric about said outlet port axis whereby the ratio of gas consumption to pickoff sensitivity is minimized and whereby the ratio of tilt angle to gas flow volume is substantially constant.

8. A gyro as claimed in claim 2, in which said pickoff cooperating portions also include a jet-supply unit with a supply chamber mounted on said stator coaxially therewith and disposed axially-inwardly of said orifice unit and said orifice unit has an inlet opening communicating with said supply chamber.

9. A gyro as claimed in claim 8, in which said jet-supply unit has a flow-restricting, pressure-reducing passage opening into said supply chamber for reducing the gas pressure in said supply chamber and for minimizing unsymmetry of the gas-bearing pressure profile.

10. A gyro as claimed in claim 1, and including a gas-bearing means for providing a gas film between said rotor and said stator having a center of suspension substantially coinciding with said pivot point for providing a balanced gas-film pressure profile.

11. A gyro as claimed in claim 10, in which said stator has a main flow passage means interconnecting said pickoff means with said bearing means whereby the ratio of gas bearing inlet pressure to pickoff inlet pressure is substantially constant.

12. A gyro as claimed in claim 11, and including a single gas supply means connecting to said flow passage means for supplying said pickoff means and said gas bearing means.

13. A gyro as claimed in claim 11, in which said stator has a pressure regulator connecting to said main flow passage means whereby a single gas supply with diminishing pressure can be used to provide a substantially constant gas pressure to said pickoff means and to said gas bearing means.

14. A gyro as claimed in claim 11, and including a gas drive means having gas nozzles with passages connecting to said main flow passage means whereby the ratio of nozzle inlet pressure to pickoff and bearing inlet pressures is substantially maximized.

15. A gyro as claimed in claim 11, and including a gas caging mechanism with a passage connecting to said main flow passage means whereby the ratio of caging inlet pressure to pickoff and bearing inlet pressures is substantially maximized.

16. A gyro as claimed in claim 15, in which said stator has an automatic shut-off valve means connecting to said main flow passage means in order to shut off flow to said drive means and to said cage means after rotor spin up while continuing flow to said gas bearing means and said pickoff means.

17. A two-axis, free-rotor gyro comprising a rotor,
a stator,
a gas drive means to spin up said rotor,
a gas caging means to position said rotor during said spin up,
a gas pickoff means to sense the angle of rotor tilt,
a gas bearing means to provide a low-friction lubricated coupling between said rotor and said stator,
a gas supply means connecting to said drive, said caging mechanism, said pickoff and said bearing,
said rotor having a spin axis and said stator having a longitudinal axis intersecting at a pivot point and forming an angle of tilt therebetween,
said rotor having a hub with a bearing having a spherically-shaped, radially-inner bearing surface and a rim having an outer edge with a plurality of turbine bucket grooves,
said stator having a base portion and a shaft fixedly connected thereto and a cap member enclosing said rotor,
said shaft having a ball portion with a spherically-shaped, radially-outer bearing surface separated from said rotor hub bearing surface by a substantially uniform gap,
said base having a peripheral wall and a pair of end walls forming a cavity and having a lower passage interconnecting said cavity to a gas supply and having an upper passage connected to said cavity and extending upward through said shaft and said ball portion,
said cage means having a plurality of caging mechanisms with respect supply passages with each cage mechanism having a cylinder and a piston received therein forming a chamber with a passage connecting to said cavity, and each cage mechanism having a spring means disposed in said cylinder urging said piston into a retracted position against gas pressure in said chamber
said caging mechanism piston having an upper end face with an opening and a conduit connecting said opening to said gas chamber for providing a gas film on said end face,
said gas supply including a compressed gas bottle with a gas release mechanism including a rupturable disk and an adjacent firing means actuated by a prescribed signal,
said gas bearing means including a main flow passage means connecting said supply to said gap between said rotor and said stator and having an automatic shut off valve disposed in said flow passage means to shut off gas flow to said drive and said cage at the end of rotor spin up and having a pressure regulator disposed in said flow passage means for providing a substantially constant gas pressure to said pickoff means and to said bearing means,
said pickoff means including a jet supply unit, a rotor jet-orifice unit, and a stator cap jet-receiver unit, with said jet-supply unit connecting to said main flow passage means and with said jet-receiver unit having outlet fluid flow tubes for connection to a vehicle steering mechanism.

References Cited

UNITED STATES PATENTS

| 3,165,282 | 1/1965 | Noyes | 74—5.6 X |
| 3,186,241 | 6/1965 | Blanding et al. | 74—5.7 X |
| 3,187,588 | 6/1965 | Parker | 74—5.6 X |
| 3,257,854 | 6/1966 | Schneider et al. | 74—5.7 |

C. J. HOSAR, *Primary Examiner.*

U.S. Cl. X.R.

74—5.43